(12) United States Patent
Larsson (10) Patent No.: US 8,838,034 B2
(45) Date of Patent: Sep. 16, 2014

(54) INTERCELL INTERFERENCE REDUCTION

(75) Inventor: Peter Larsson, Solna (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 951 days.

(21) Appl. No.: 12/996,846

(22) PCT Filed: Jun. 18, 2008

(86) PCT No.: PCT/EP2008/057678
§ 371 (c)(1),
(2), (4) Date: Dec. 8, 2010

(87) PCT Pub. No.: WO2009/152852
PCT Pub. Date: Dec. 23, 2009

(65) Prior Publication Data
US 2011/0086654 A1 Apr. 14, 2011

(51) Int. Cl.
*H04B 1/00* (2006.01)
*H04B 7/06* (2006.01)
*H04B 7/04* (2006.01)

(52) U.S. Cl.
CPC ............................... *H04B 7/0619* (2013.01); *H04B 7/0417* (2013.01)
USPC ..................... 455/63.1; 455/67.13; 455/501

(58) Field of Classification Search
CPC ........................ H04B 7/0417; H04B 7/0619
USPC ...................................... 455/63.1, 67.13, 501
See application file for complete search history.

(56) References Cited

U.S. PATENT DOCUMENTS

| 2003/0139139 A1 | 7/2003 | Onggosanusi et al. |
| 2007/0211786 A1 | 9/2007 | Shattil |
| 2008/0144737 A1 | 6/2008 | Naguib |

FOREIGN PATENT DOCUMENTS

| EP | 0684706 A1 | 11/1995 |
| EP | 1206049 A1 | 5/2002 |
| EP | 1276251 A1 | 1/2003 |
| WO | 2005064975 A1 | 7/2005 |

OTHER PUBLICATIONS

International Preliminary Report on Patentability mailed on Oct. 19, 2010 in corresponding International Application No. PCT/EP2008/057678.
Jeffrey G. Andrews, et al.; "Overcoming Interference in Spatial Multiplexing MIMO Cellular Networks"; Submitted to IEEE Wireless Communications Magazine, Last Modified Oct. 20, 2006.
H. Viswanathan, et al.; "Downlink Capacity Evaluation of Cellular Networks With Known-Inteference Cancellation"; IEEE Journal on Selected Areas in Communications; Jun. 2003; pp. 802-811 vol. 21, No. 5.
Jiansong Gan, et al.; Research Article, "On Sum Rate and Power Consumption of Multi-User Distributed Antenna System with Circular Antenna Layout"; Hindawi Publishing Corporation, Eurasip Journal on Wireless Communications and Networking, vol. 2007, Article ID 89780, Jul. 29, 2007; 9 pages; Department of Electronic Engineering, Tsinghua University, Room 4-405 FIT Building, Beijing 100084, China.
International Search Report mailed on Apr. 23, 2009 in corresponding International Application No. PCT/EP2008/057678.
Written Opinion of the International Searching Authority mailed on Apr. 23, 2009 in corresponding International Application No. PCT/EP2008/057678.

*Primary Examiner* — Raymond Dean
(74) *Attorney, Agent, or Firm* — Patent Portfolio Builders PLLC (57) ABSTRACT

A distributed antenna system based wireless cellular communication system with transmit side linear interference cancellation is described. In this system the effective channel elements (I) and (II) are estimated and reported by mobile station MS1 and MS2, respectively, to a transmit weight matrix processing apparatus. Processing apparatus uses the effective complex channel matrix (one row reported by each mobile station) to differentially update the transmit weight matrix used for the transmit side linear interference cancellation.

5 Claims, 8 Drawing Sheets

FIG. 12

INTERCELL INTERFERENCE REDUCTION

TECHNICAL FIELD

The present invention relates generally to interference management in wireless cellular communication systems, and especially to intercell interference reduction in the downlink.

BACKGROUND

Various methods to manage interference between adjacent radio links are well known, including but not limited to power control, link adaptation, resource allocation, scheduling, reuse partitioning, fractional loading, etc. Sometimes the term InterCell Interference Coordination (ICIC) is used for mechanisms aiming at improving the interference situation in a multicell system.

Another approach is the notion of a distributed antenna system (DAS), also denoted coordinated multipoint transmission (COMPTR). Reference [1] describes distributed DAS signal processing as well as DAS specific power and rate control methods on the uplink. DAS on the uplink is also described in [2].

The idea of dirty paper coding (DPC) for MIMO (Multiple Input Multiple Output) has also been proposed to be applied to DAS. This involves non-linear pre-coding and non-linear demodulation. The DPC DAS idea on the downlink is investigated in [3].

A good overview of most of the above schemes may be found in [4].

A problem with classical ICIC methods is that they are indirect in the sense that they reduce the symptom of interference, but do not address the core problem itself. This symptom oriented design limits the prospect of power (or energy) efficiency and high data rate performance.

A problem with linear IC and non-linear IC (DPC) based methods for DAS is that they require very precise channel state information to perform well.

SUMMARY

An object of the present invention is to relax the requirements on the detailed knowledge of the channel state for downlink interference suppression in distributed antenna system based wireless cellular communication with transmit side linear interference cancellation This object is achieved in accordance with the attached claims.

Briefly, the present invention involves differentially updating the complex transmit weight matrix used for the transmit side linear interference cancellation based on determined estimates of an effective complex channel matrix in a closed loop manner.

One aspect of the invention is a method of downlink interference suppression for distributed antenna system based wireless cellular communication with transmit side linear interference cancellation, including the steps of determining effective complex channel matrix estimates and differentially updating a complex transmit weight matrix based on the determined estimates.

Another aspect of the invention is a distributed antenna system based wireless cellular communication system with transmit side linear interference cancellation, including means adapted to determine effective complex channel matrix estimates means adapted to differentially update a complex transmit weight matrix based on the determined estimates.

Another aspect of the invention is a transmit weight matrix processing method for distributed antenna system based wireless cellular communication with transmit side linear interference cancellation, including the steps of determining the inverse of an effective complex channel matrix from estimates of an effective complex channel matrix reported by mobile stations, updating a differential update matrix based on the determined inverse of the effective complex channel matrix, and differentially updating a complex transmit weight matrix based on the updated differential update matrix.

Another aspect of the invention is a transmit weight matrix processing apparatus for a distributed antenna system based wireless cellular communication system with transmit side linear interference cancellation, including an inverter adapted to determine the inverse of an effective complex channel matrix from estimates of the effective complex channel matrix reported by mobile stations, a differential update matrix forming unit adapted to update a differential update matrix based on the determined inverse of the effective complex channel matrix, and a transmit weight matrix update unit adapted to differentially update a complex transmit weight matrix based on the updated differential update matrix.

Another aspect of the invention is a channel estimate reporting method in distributed antenna system based wireless cellular communication with transmit side linear interference cancellation, including the steps of receiving pilot signals from different cells of the wireless cellular communication system at a mobile station, estimating elements of an effective complex channel matrix based on the received pilot signals, and reporting at least selected estimated elements on an uplink.

Another aspect of the invention is a mobile station for a distributed antenna system based wireless cellular communication system with transmit side linear interference cancellation, including means adapted to receive pilot signals from different cells of the wireless cellular communication system, means adapted to estimate elements of an effective complex channel matrix based on the received pilot signals, and means adapted to report at least selected estimated elements on an uplink.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the following description elements performing the same or similar functions will be denoted by the same reference designations.

Additionally, in order to avoid cluttering of figures and equations, typically only two interfering radio links will be described in the various embodiments. However, it is to be understood that in general there may be more than two interfering links.

Furthermore, in the following description some entities (signals, vectors, matrices) will be referred to as "complex". This is to be understood as "complex valued", i.e. the entities are represented by real and imaginary components.

The scenario in which the present invention may be used will now be described with reference to FIG. 1-4.

Figure 1:
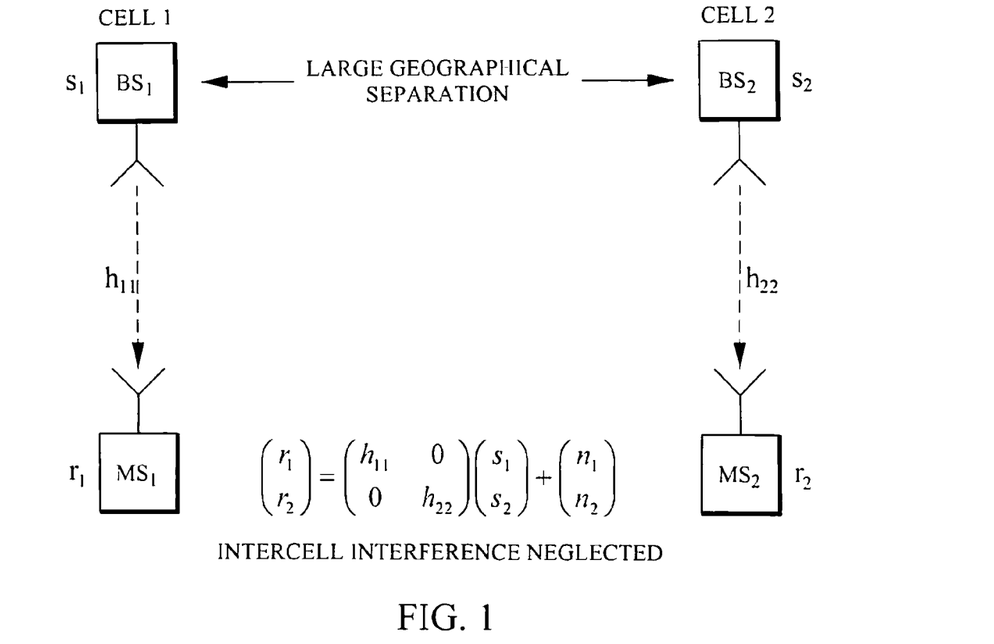
FIG. 1 is a diagram illustrating a wireless cellular communication system in which intercell interference is neglected.

FIG. 1 is a diagram illustrating a wireless cellular communication system in which intercell interference is neglected. Base stations $BS_1$, $BS_2$ transmit in the downlink to mobile stations $MS_1$, $MS_2$ over corresponding channels $h_{11}$ and $h_{22}$, respectively. Although both downlinks are assumed to use the same radio resource, the interference is neglected in this case, due to the further assumption that there is a large geographical separation between the base stations (and mobiles). For this reason a complex baseband signal $s_1$ transmitted to mobile station $MS_1$ is received as a complex baseband signal $r_1$, which is only influenced by the channel $h_{11}$. Similar comments apply to signals $s_2$, $r_2$ and channel $h_{22}$. Mathematically this can be expressed as $$\begin{pmatrix} r_1 \\ r_2 \end{pmatrix} = \begin{pmatrix} h_{11} & 0 \\ 0 & h_{22} \end{pmatrix} \begin{pmatrix} s_1 \\ s_2 \end{pmatrix} + \begin{pmatrix} n_1 \\ n_2 \end{pmatrix} \quad (1)$$

where $n_1$, $n_2$ is the noise added to each channel.

Figure 2:
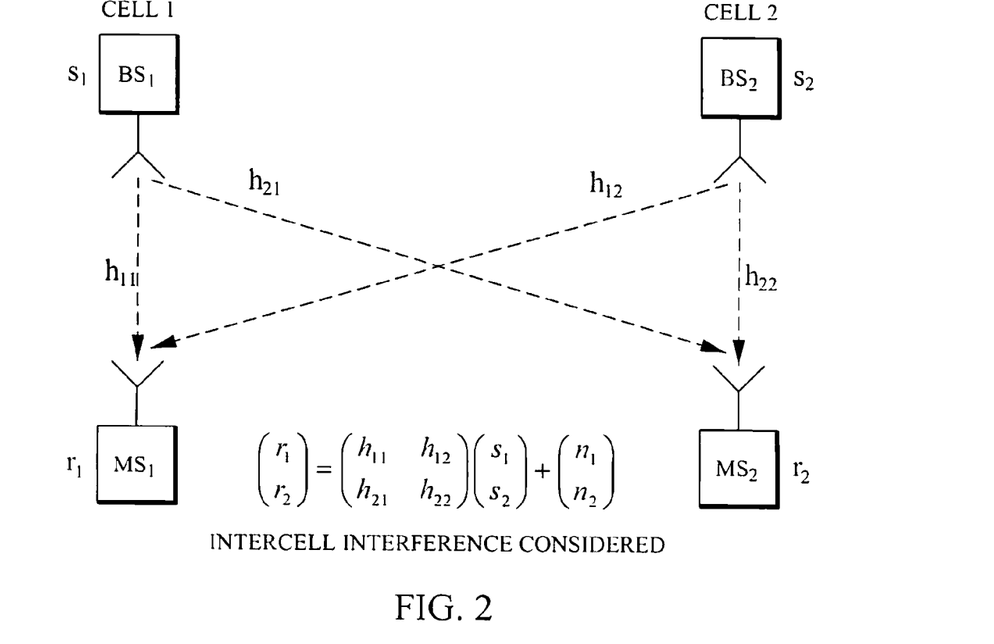
FIG. 2 is a diagram illustrating a wireless cellular communication system in which intercell interference is considered.

FIG. 2 is a diagram illustrating a wireless cellular communication system in which intercell interference is considered. This situation occurs when the mentioned geographical separation is reduced, so that the interference can no longer be neglected. The interference manifests itself as non-zero off-diagonal elements $h_{12}$, $h_{21}$ in the complex channel matrix H. This modifies (1) into $$\begin{pmatrix} r_1 \\ r_2 \end{pmatrix} = \begin{pmatrix} h_{11} & h_{12} \\ h_{21} & h_{22} \end{pmatrix} \begin{pmatrix} s_1 \\ s_2 \end{pmatrix} + \begin{pmatrix} n_1 \\ n_2 \end{pmatrix} \quad (2)$$

or in compact matrix form (valid for any number of radio links)

$$r = Hs + n \quad (3)$$

Intercell interference is caused by reuse of the same radio resource in several cells. Examples are illustrated in FIGS. 3 and 4.

Figure 3:
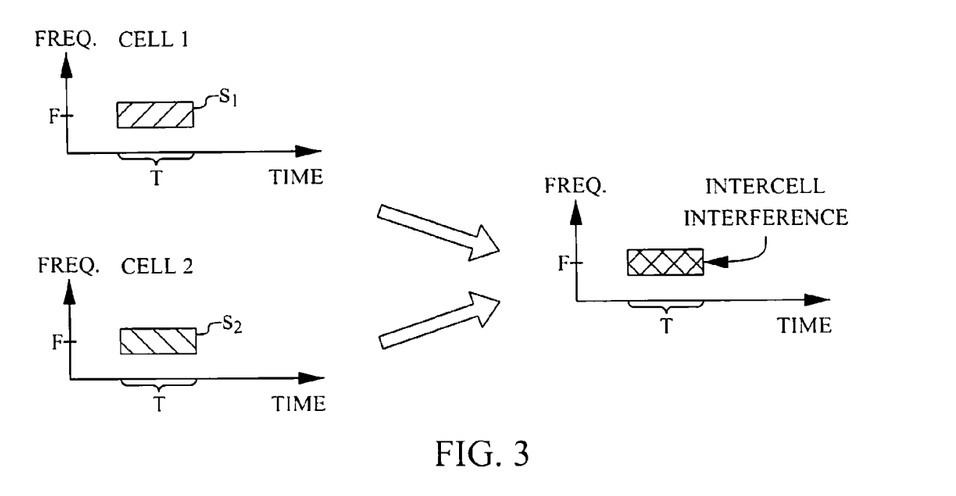
FIG. 3 illustrates an example of intercell interference caused by reuse of the same radio resource.

In FIG. 3 cell 1 uses a time slot of duration T occupying a frequency band centered at frequency F for transmitting signal $s_1$ on one downlink (upper left part of FIG. 3). Cell 2 uses the same radio resource for transmitting signal $s_2$ on another downlink (lower left part of FIG. 3). As illustrated by the cross-hatched radio resource on the right in FIG. 3 this causes interference at the mobile stations.

Figure 4:
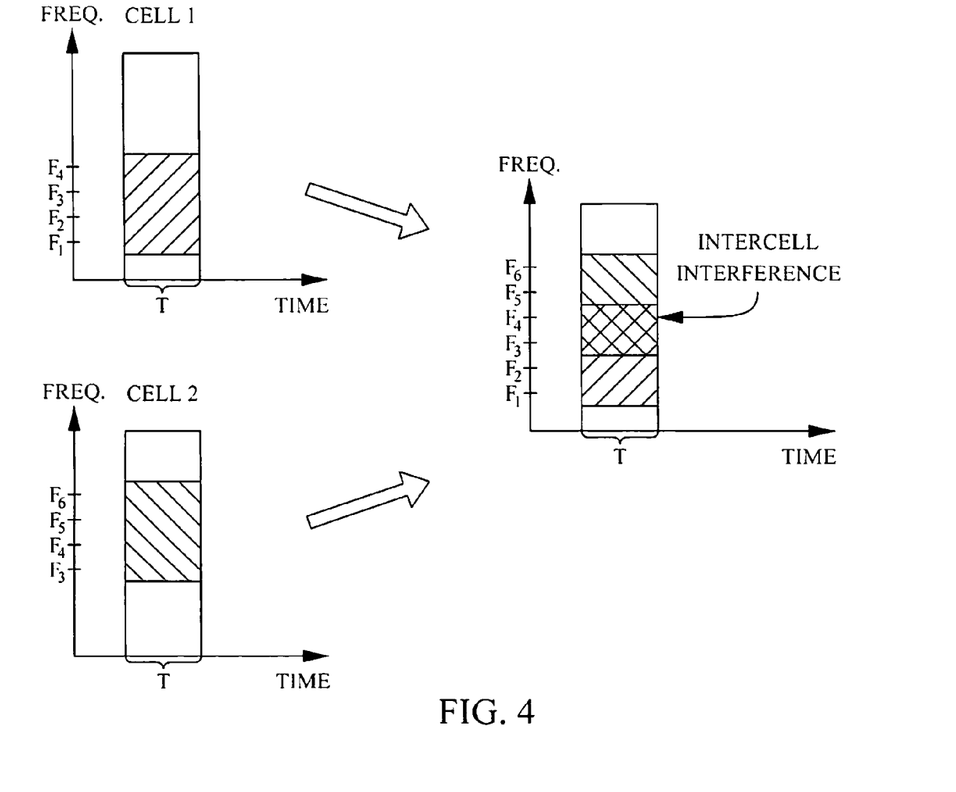
FIG. 4 illustrates another example of intercell interference caused by reuse of the same radio resource.

FIG. 4 illustrates another example of intercell interference caused by reuse of the same radio resource. This example refers to a multi-carrier wireless system, for example an OFDM/OFDMA system. In this case cell 1 uses a radio resource formed by a time slot of duration T but spanning a set or block of frequency bands centered at frequencies $F_1, K, F_4$ for transmitting on one downlink (upper left part of FIG. 4). Cell 2 uses a radio resource formed by a time slot of duration T spanning a block of frequency bands centered at frequencies $F_3, K, F_6$ for transmitting on another downlink (lower left part of FIG. 4). As illustrated by the cross-hatched radio resource block on the right in FIG. 4 this causes interference at the mobile stations in the overlapping frequency bands centered at frequencies $F_3, F_4$.

Figure 5:
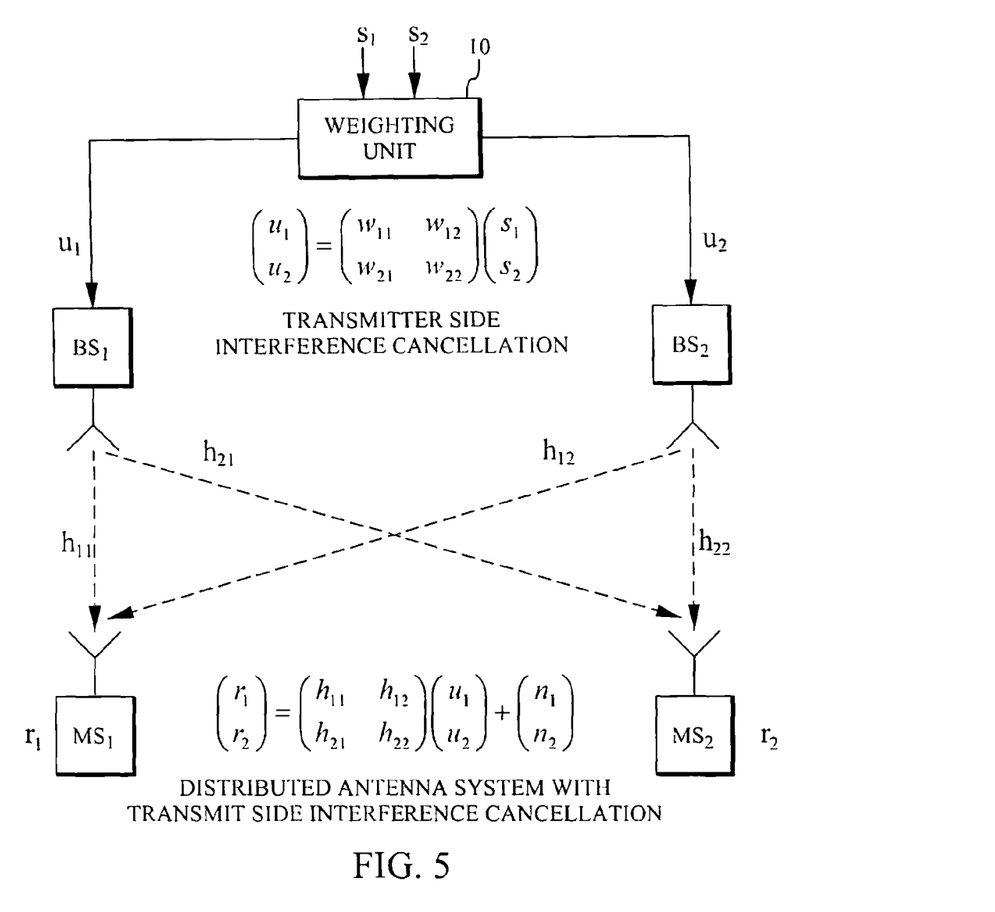
FIG. 5 is a diagram illustrating a wireless cellular communication system in which downlink intercell interference is reduced by a distributed antenna system with transmit side interference cancellation.

FIG. 5 is a diagram illustrating a wireless cellular communication system in which downlink intercell interference is reduced by a distributed antenna system with transmit side linear interference cancellation. A weighting unit 10 connected to the base stations receives the complex baseband signals $s_1, s_2$ and applies a complex transmit weight matrix W to them in accordance with $$\begin{pmatrix} u_1 \\ u_2 \end{pmatrix} = \begin{pmatrix} w_{11} & w_{12} \\ w_{21} & w_{22} \end{pmatrix} \begin{pmatrix} s_1 \\ s_2 \end{pmatrix} = \underbrace{\begin{pmatrix} w_{11}s_1 + w_{12}s_2 \\ w_{21}s_1 + w_{22}s_2 \end{pmatrix}}_{\text{superpositions}} \quad (4)$$

The obtained superposition signals $u_1, u_2$ are transmitted by the respective base station over the complex matrix valued channel H. Thus each base station actually transmits a mixture of the original signals $s_1, s_2$. In this scheme the relationship between the original signals $s_1, s_2$ and the received signals $r_1, r_2$ is $$\begin{pmatrix} r_1 \\ r_2 \end{pmatrix} = \begin{pmatrix} h_{11} & h_{12} \\ h_{21} & h_{22} \end{pmatrix} \begin{pmatrix} w_{11} & w_{12} \\ w_{21} & w_{22} \end{pmatrix} \begin{pmatrix} s_1 \\ s_2 \end{pmatrix} + \begin{pmatrix} n_1 \\ n_2 \end{pmatrix} \quad (5)$$

$$= \begin{pmatrix} h_{11} & h_{12} \\ h_{21} & h_{22} \end{pmatrix} \underbrace{\begin{pmatrix} w_{11}s_1 + w_{12}s_2 \\ w_{21}s_1 + w_{22}s_2 \end{pmatrix}}_{\text{superpositions}} + \begin{pmatrix} n_1 \\ n_2 \end{pmatrix}$$

or in compact matrix form (valid for any number of radio links)

$$r = H(Ws) + n \quad (6)$$

The general idea behind the transmit side interference cancellation performed by the weighting is to choose a transmit weight matrix W that orthogonalizes the product matrix HW, i.e. ideally HW=I, where I is the unit matrix. Using this in (6) gives $$r = (HW)s + n = s + n \quad (7)$$

i.e. the intercell interference is cancelled. However, the condition HW=I implies that $$W=H^{-1} \quad (8)$$

i.e. choosing the correct transmit weight matrix requires (in fact rather exact) knowledge of the complex channel matrix H.

A basic idea of the present invention, in a scenario as in FIG. 5, is to perform closed loop interference reduction by feeding back information and applying differential updates to the previous transmit weights in order to suppress undesired intercell interference.

The rationale for this differential update approach is that any deviation from the desired interference reduced result is adjusted successively to asymptotically reduce the error from the desired end result.

Instead of adjusting merely the previously used power level (or equivalently the gain), as in closed loop power control, the phase is also adjusted in the proposed invention. Moreover, in contrast to classical closed loop power control, the proposed invention does not merely adjust transmit weights for the own link, but also transmit weights that corresponds to interfering links.

In the following it will be assumed that the radio channels are insubstantially time dispersive channel or that OFDM/OFDMA is used if the channel is substantially time dispersive.

When a channel is time dispersive, this translates into inter-symbol interference, when considering the time domain, and frequency selective channels, when considering the frequency domain. If we, as assumed here, use OFDM/OFDMA or a non-time dispersive channel, it allows us to use a straightforward matrix formulation to model and solve the problem for each non-time dispersive resource. A time dispersive channel using single carrier transmission and processing taking place in the time-domain can of course also be handled, but incurs higher complexity, is more complicated to model and handle, and does not follow the trend of communication, which is currently to use OFDM or OFDMA type of techniques.

Assume that the $n^{th}$ iteration used the transmit weight matrix $W^{(n)}$, and we want to determine a differential update for the $(n+1)^{th}$ iteration yielding a new $W^{(n+1)}$, i.e.

$$W^{(n+1)} = W^{(n)} \Delta W^{(n+1)} \quad (9)$$

so that $$r = (HW^{(n+1)})s + n \to Qs + n \quad (10)$$

for large n, where Q is a desired link quality matrix. The diagonal of Q contains the target amplitude levels of the desired signal at each mobile station and the off-diagonal elements represent the target amplitude levels for the interfering signals. For perfect interference cancellation one would require zeros on the off-diagonal elements of Q. When different signal qualities are desired for each link (for example for different guaranteed service qualities), one may set $$Q = \begin{pmatrix} \sqrt{\sigma_1 \Gamma_1} & 0 & L & 0 \\ 0 & \sqrt{\sigma_2 \Gamma_2} & L & 0 \\ M & M & O & \\ 0 & 0 & L & \sqrt{\sigma_K \Gamma_K} \end{pmatrix} \quad (11)$$

where $\sigma_k$ is the noise level and $\Gamma_k$ is the SNR for link k. Here k=1,K,K, where K is the number of downlinks using the same radio resource. If all SNRs and noise levels are identical, one may set $Q=\sqrt{\sigma \Gamma} I$, where I is the unit or identity matrix.

Hence, the differential update matrix $\Delta W^{(n+1)}$ can be determined through the following relation $$HW^{(n+1)} = Q \Rightarrow HW^{(n)} \Delta W^{(n+1)} = Q \Rightarrow \Delta W^{(n+1)} = (E^{(n)})^{-1} Q \quad (12)$$

where $E^{(n)} = HW^{(n)}$ is the previous effective complex channel matrix. In this context "effective" means a cascade of the actual radio channel matrix and the transmit weight matrix, i.e. it is the channel matrix "seen" by signals $s_1$, $s_2$.

Figure 6:
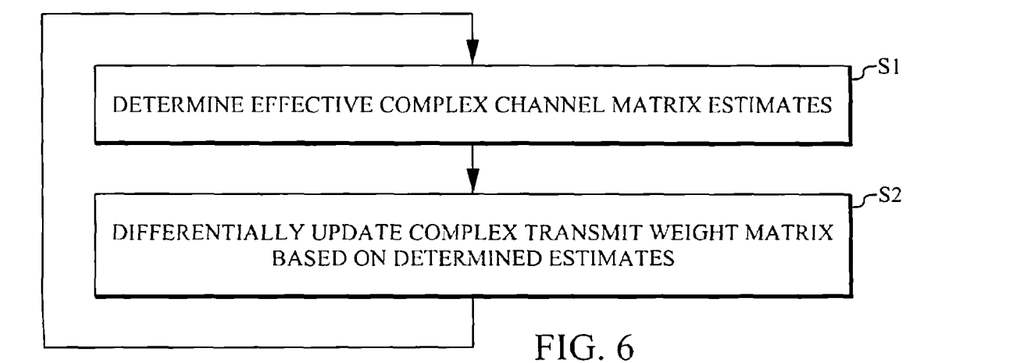
FIG. 6 is a flow chart of an embodiment of a method in accordance with the present invention for downlink interference suppression in distributed antenna system based wireless cellular communication with transmit side linear interference cancellation.

The method is summarized in FIG. 6. Step S1 determines an effective channel estimate based on reports from mobile stations. Thereafter step S2 differentially updates the complex transmit weight matrix based on the determined estimates. Steps S1 and S2 are repeated at the next update.

Figure 7:
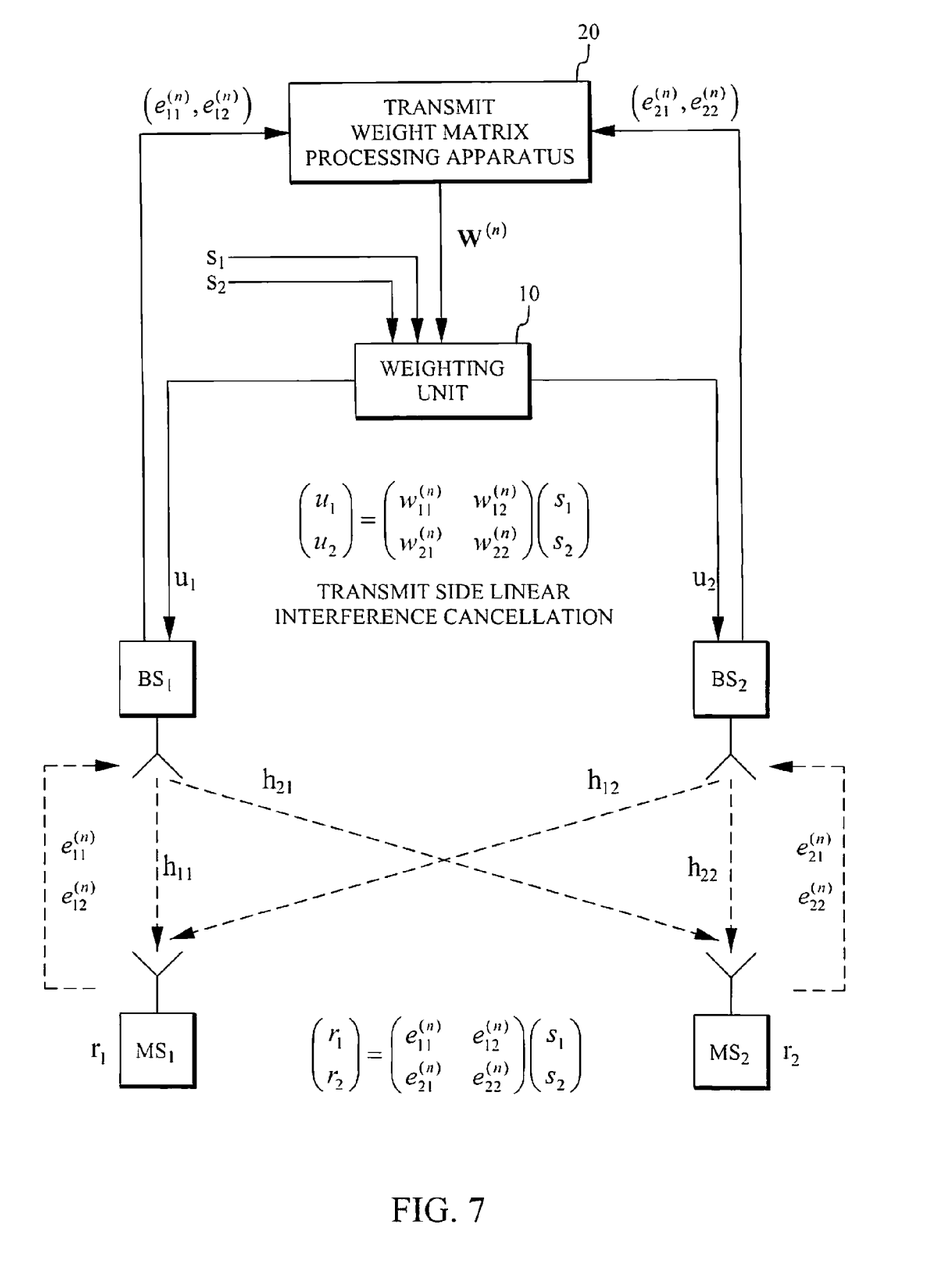
FIG. 7 is a diagram illustrating an embodiment of a wireless cellular communication system in accordance with the present invention.

FIG. 7 is a diagram illustrating an embodiment of a wireless cellular communication system in accordance with the present invention. In this system the effective complex channel elements $e_{11}^{(n)}, e_{12}^{(n)}$ and $e_{21}^{(n)}, e_{22}^{(n)}$ are estimated and reported by mobile station $MS_1$ and $MS_2$, respectively to a transmit weight matrix processing apparatus 20. Thus, processing apparatus 20 now has access to the entire effective complex channel matrix $E^{(n)}$ (one row reported by each mobile station) and can form its inverse and update the transmit weight matrix to $W^{(n+1)}$ in accordance with (12) and (9).

While the transmit weight matrix processing apparatus 20 could be located at some independent location, it is preferably located together with the weighting unit 10. However, an optional implementation of the transmit side of the architecture in FIG. 7 could be to distribute part of the weighting unit 10 to each base station, and then send the data $s_1, s_2$ and so on to all base stations, where the relevant weighting would be performed. If such a distributed architecture would be used, one would still need to centrally compute the transmit weights and such an implementation the transmit weight matrix processing apparatus 20 may be placed independently at some suitable location.

In the centralized embodiment illustrated in FIG. 7 almost all functionality may be implemented in the unit that generates signals $s_1$, $s_2$. The functionality remaining in the base stations includes at least transport units that receive (and send for the uplink) the weighted signals. This transmission can be performed over optical fiber, free space optics or common transport networks. Two methods of transferring this information are in analog or in digital form. The analog transmission may be implemented as AM modulated laser that only requires an am detector to extract the baseband or RF signalling. The digital case a D/A conversion and preferably filtering will be required. Furthermore, the base stations should also have RF sections, since RF is not received at the appropriate frequency directly over the optical fiber for mixing of the baseband signals up to radio frequency, amplification and forwarding to antennas. Common components of radio base stations, such as duplex filters may be used. Thus, a "base station" may include only the RF part, parts of the baseband processing and transport units. Optionally some monitoring functionality may be implemented. There also exists an interface denoted CIPRI for sending digitized baseband data. Phy parts, such as FEC coding, L2, L3 and higher typically may be implemented outside of the base stations.

Since $E^{(n)}$ may contain a large number of elements (when there are more than two links) the feedback overhead may become significant. In a preferred embodiment this situation may be handled by only estimating and sending back the dominating (in magnitude) elements in $E^{(n)}$. This can be accomplished in different ways, where a few examples are:

i) The M strongest values are reported back, where $2 \leq M \leq K$ (the smaller the less the feedback but also the slower the convergence). Here K is the number of links using the same radio resource.

ii) All values that are above a predetermined percentage of the peak value seen by a receiving mobile station are reported back.

Figure 8:
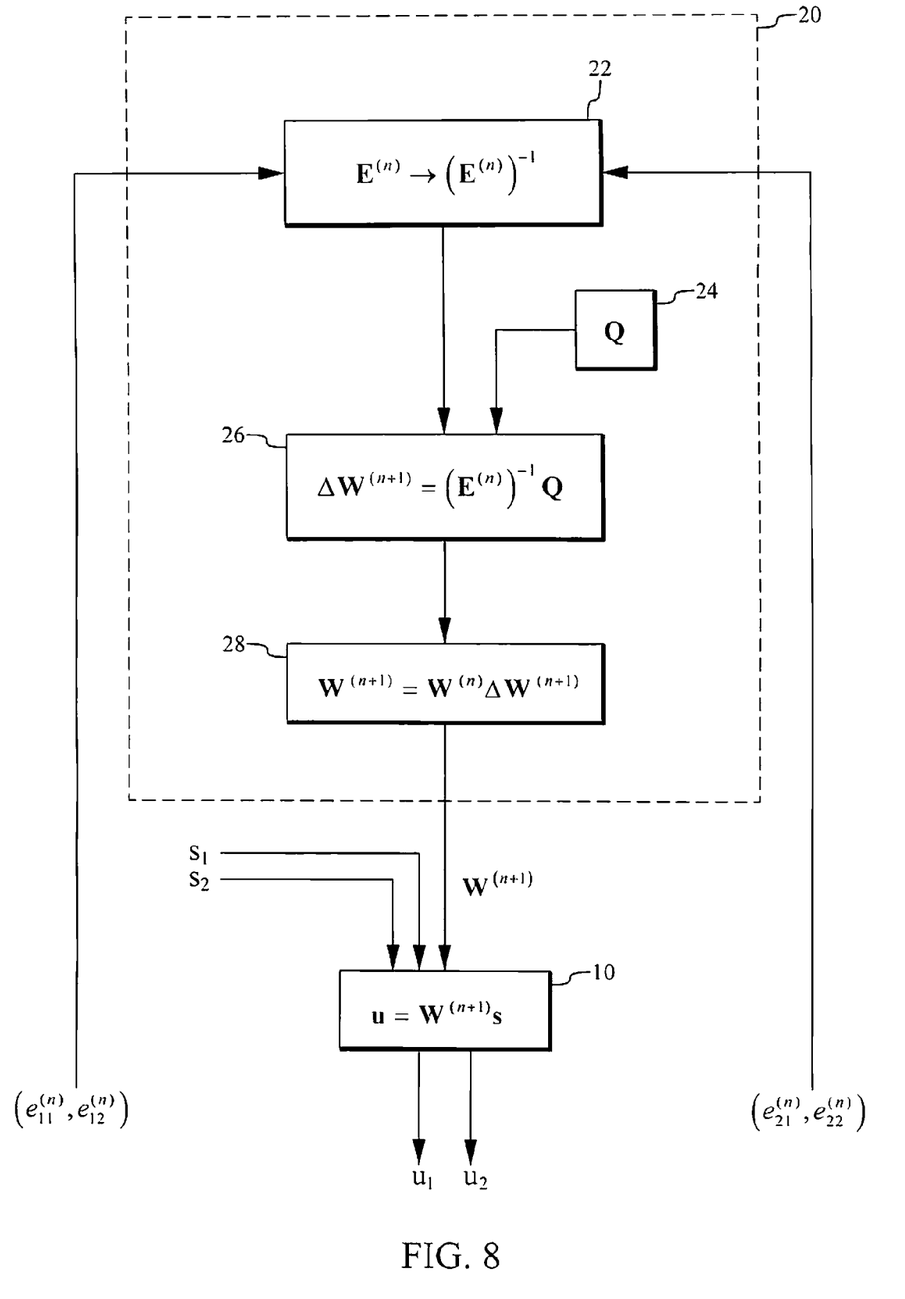
FIG. 8 is a block diagram of an embodiment of a transmit weight matrix processing apparatus in accordance with the present invention.

FIG. 8 is a block diagram of an embodiment of a transmit weight matrix processing apparatus 20 in accordance with the present invention. A matrix inverter 22 receives effective complex channel matrix estimates $e_{11}^{(n)}, e_{12}^{(n)}$ and $e_{21}^{(n)}, e_{22}^{(n)}$ reported by mobile stations $MS_1$, $MS_2$, respectively, and forms the inverse of the effective channel matrix $E^{(n)}$. This inverse and a desired link quality matrix Q stored in a memory unit 24 are forwarded to a differential update matrix forming unit 26, which updates the differential update matrix to $\Delta W^{(n+1)}$ in accordance with (12). $\Delta W^{(n+1)}$ is forwarded to a transmit weight matrix update unit 28, which updates the transmit weight matrix to $W^{(n+1)}$ in accordance with (9). $W^{(n+1)}$ is forwarded to weighting unit 10, which weights the next input signal vector s.

Figure 9:
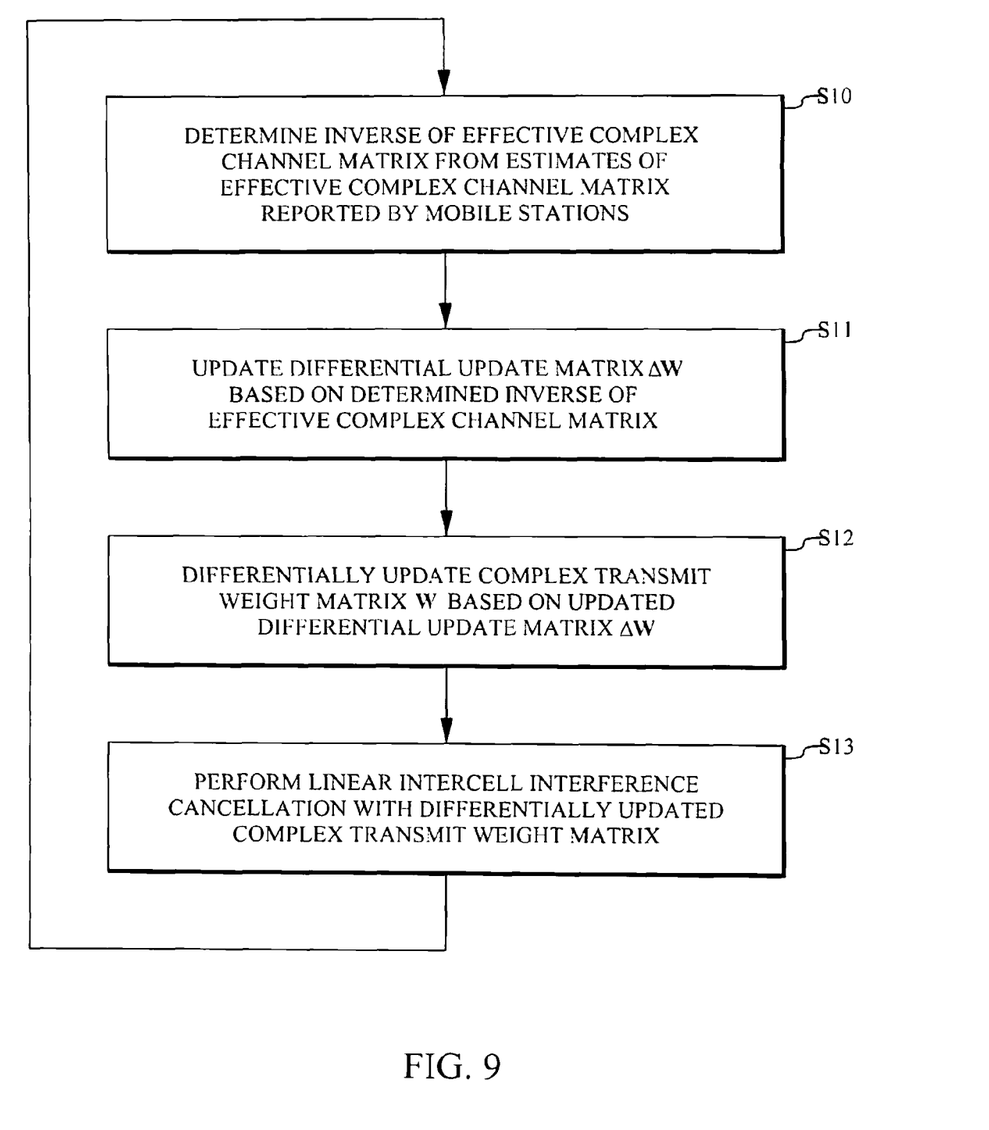
FIG. 9 is a flow chart of an embodiment of a transmit weight matrix processing method in accordance with the present invention.

FIG. 9 is a flow chart of an embodiment of a transmit weight matrix processing method in accordance with the present invention. Step S10 determines the inverse of the effective complex channel matrix from estimates of effective complex channel matrix elements reported by mobile stations. Step S11 updates the differential update matrix to $\Delta W^{(n+1)}$ based on the determined inverse of the effective complex channel matrix. Step S12 differentially updates the complex transmit weight matrix to $W^{(n+1)}$ based on the current differential update matrix $\Delta W^{(n+1)}$. Step S13 performs linear intercell interference cancellation with the differentially updated complex transmit weight matrix. These steps are repeated at the next update.

Figure 10:
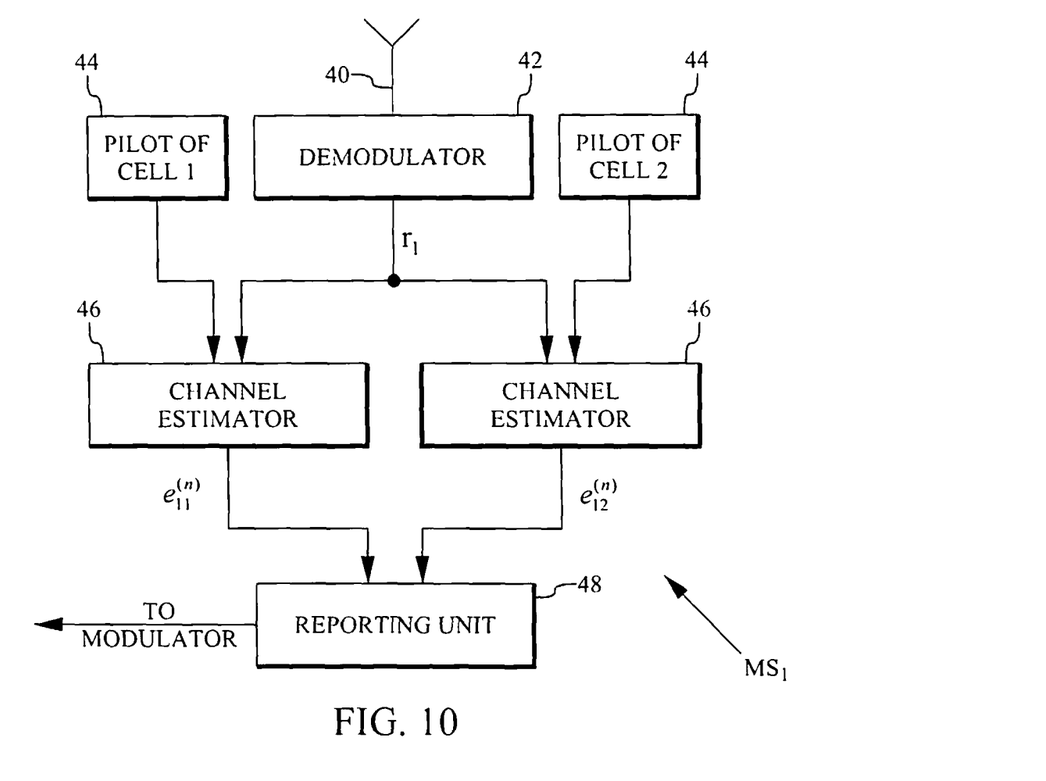
FIG. 10 is a block diagram of an embodiment of a mobile station in accordance with the present invention.

FIG. 10 is a block diagram of an embodiment of a mobile station, for example mobile station $MS_1$, in accordance with the present invention. In FIG. 10 only elements required to explain the principles of the present invention are included. An antenna 40 receives signals from multiple cells using the same radio resource. The resulting signal is demodulated down to baseband in a demodulator 42 to form complex baseband signal $r_1$. At predetermined time instances the original signals $s_1$, $s_2$ will comprise pilot signals, which are unique for each cell and are known by the receiver (they are stored in memory 44). Thus, the received signal $r_1$ will be a mixture of known pilot signals from several cells using the same radio resource. The received signal $r_1$ and the known pilot signals are forwarded to channel estimators 46, which determine the effective complex channel matrix element estimates $e_{11}^{(n)}, e_{12}^{(n)}$ (in FIG. 10 each link has its own channel estimator, but it is also possible to have a single channel estimator that is used to determine one estimate after the other). The determined estimates $e_{11}^{(n)}, e_{12}^{(n)}$ are collected by a reporting unit 48, which forwards them to a modulator for transmission on the uplink. In this way a row of the effective complex channel matrix $E^{(n)}$ is reported back to transmit weight matrix processing unit 20. The remaining rows of matrix $E^{(n)}$ are obtained in a similar way from the other mobile stations.

Reporting unit 48 may also include a selection arrangement that only reports the strongest (in magnitude) estimates, see the discussion in paragraphs i) and ii) above. Reporting unit 48 may also, instead of omitting transmission of the weakest estimates, compress the information, for example by transmitting the differential changes relative the previous estimates.

Figure 11:
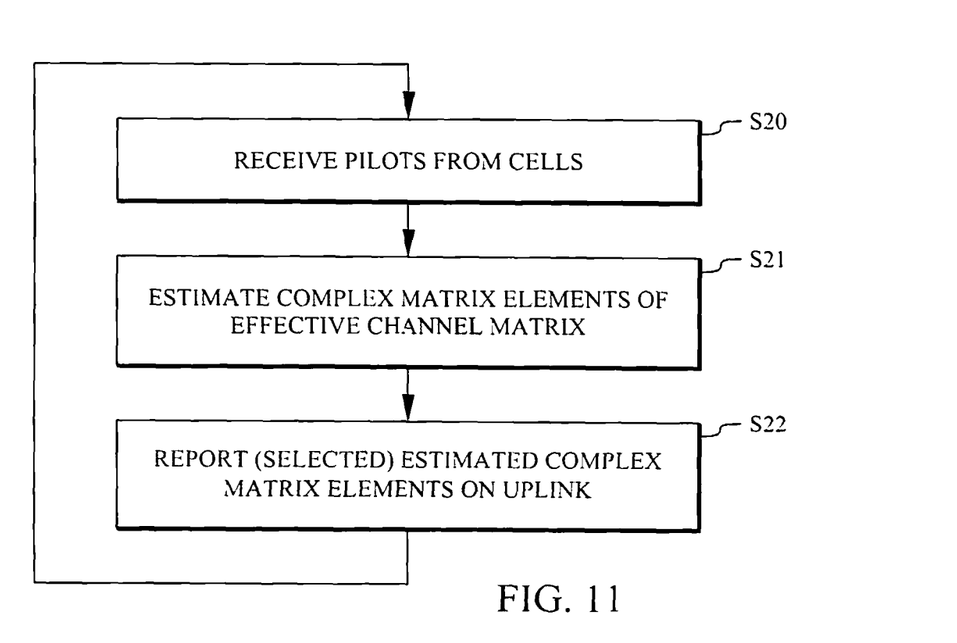
FIG. 11 is a flow chart of an embodiment of a channel estimate reporting method in accordance with the present invention.

FIG. 11 is a flow chart of an embodiment of a channel estimate reporting method in accordance with the present invention. Step S20 receives pilot signals from the different cells using the same radio resource. Step S21 estimates the complex elements of the effective channel matrix. Step S22 reports (possibly selected, see previous paragraph) estimated effective complex channel matrix elements on an uplink. These steps are repeated the next time pilot signals are received.

The differential update model based on (9) may be characterized as a product oriented differential update method. An alternative is a difference oriented method in which (9) is replaced by $$W^{(n+1)} = W^{(n)} - \Delta W^{(n+1)} \tag{13}$$

In this embodiment the update $\Delta W^{(n+1)}$ can be determined through the following relation $$HW^{(n+1)} = Q \Rightarrow H(W^{(n)} - \Delta w^{(n+1)}) = Q \Rightarrow \Delta W^{(n+1)} = H^{-1}(E^{(n)} - Q) \tag{14}$$

It is true that in this case $H^{-1}$ (and thus H) must be known in addition to $E^{(n)}$, but it has been found that it is possible to relax the requirements on the detailed knowledge of H due to the differential and iterative nature of the update method.

In an implementation of the difference oriented method the mobiles will report estimates of both H and E. The effective channel matrix E is determined in the same way as described above in connection with the product oriented method. The actual radio channel matrix H may be determined by temporarily setting the transmit weight matrix W to the unity matrix I during estimation of H. In this way H temporarily becomes the "effective" channel matrix, which implies that channel estimation method on the receiver side may be used without changes.

The functionality of the various blocks and steps described above may be implemented by one or several micro processors or micro/signal processor combinations and corresponding software.

Figure 12:
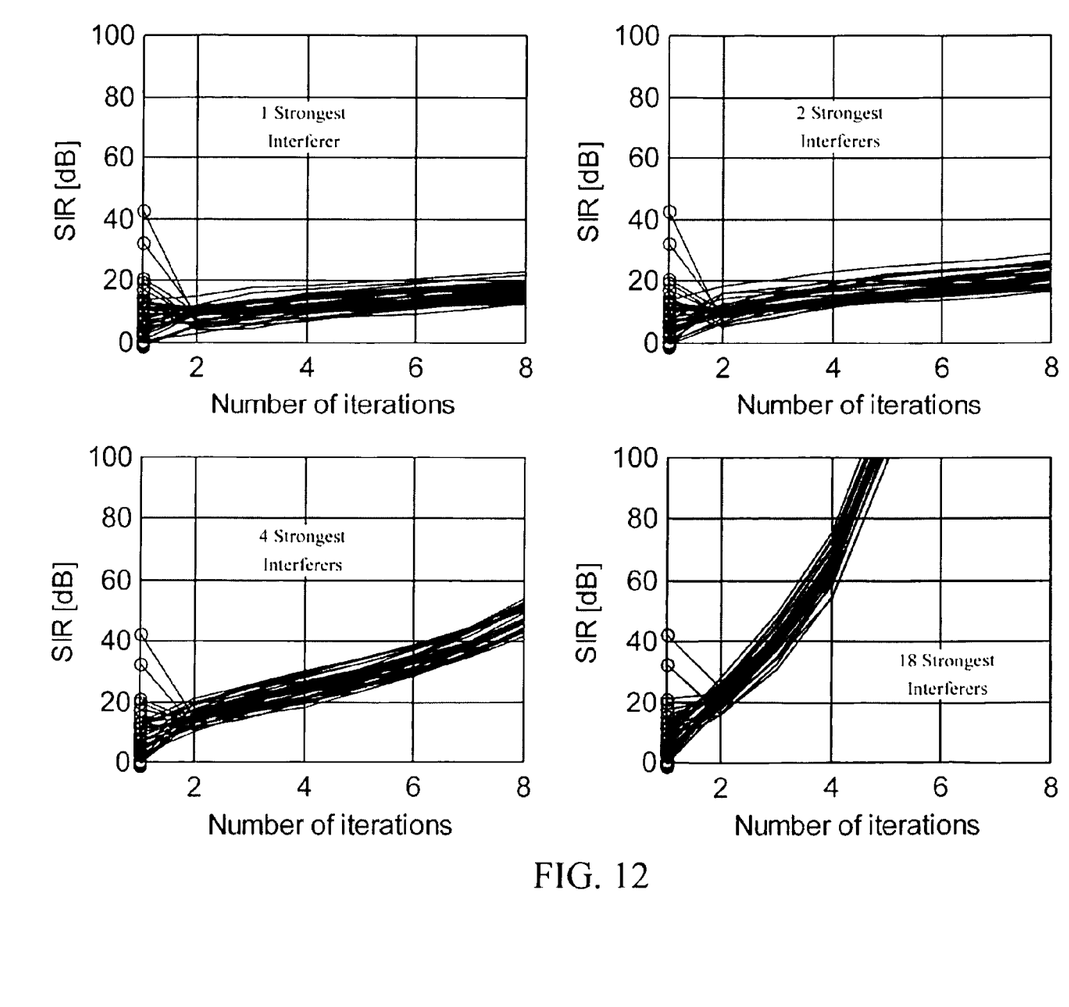
FIG. 12 illustrates the results from simulations of an embodiment of the present invention.

FIG. 12 illustrates the results from simulations of the product oriented differential update method described by (9). The simulations determined the SIR (Signal to Interference Ratio) for each downlink in a hexagonal 36 cell system with 36 uniformly distributed mobiles, all using the same time slot and frequency band (radio resource). The pathloss PL to each mobile was modeled as $PL = R^{-\alpha}$, where R is the distance from a base station to the corresponding mobile. The parameter $\alpha$ was set to 3.5. The evolution of the iterations is illustrated for 4 cases accounting for 1, 2, 4, 18 strongest interferes, respectively (as described in paragraph i) above). The remaining elements of $E^{(n)}$ were set to zero, hence the amount of information fed back to the respective sender was reduced relative to feeding back all effective channel state information. Furthermore, the quality matrix Q was set to the unity matrix I.

The diagrams in FIG. 12 show the evolution of the SIR in the downlink to each of the 36 mobiles from an initial state where the transmit weight matrix W was set to the unity matrix I (thus it was assumed that initially there was no knowledge of the state of the channel, so every downlink is treated the same way). The reason that the different mobiles initially have different SIRs is that they have different pathlosses due to different distances to their "own" base stations. It is noted that for the case where only 1 or 2 interferers are considered, the SIR will increase, but rather slowly. On the other hand, already the case where the 4 strongest interferers are considered gives a significant improvement. In this case the SIRs of all 36 mobiles has increased after 8 iterations, irrespective of the distance between the mobiles and the "own" base station. When the 18 strongest interferes are considered all the SIRs have increased significantly already after 4 iterations, and continue to increase very rapidly thereafter.

The present invention has several advantages, some of which are:

- The intercell interference is reduced, which ensures that the SINR is enhanced and hence the data rate may be increased and/or more power (or energy) efficient communication may be ensured.
- Users near a cell border often suffer from degraded performance due to intercell interference. By reducing this interference the performance becomes more homogenous when traversing from the cell center to the cell boarder.
- By sending complex valued feedback for updating the transmit weights related to the desired as well as interfering signal(s), the problem of channel estimation errors, which has been ignored in traditional DAS, as well as the transmit weight errors are successively reduced. Since the errors are successively reduced, the resulting SIR of the proposed method becomes better than just simply measuring the channel matrix H with inherent errors.
- By only sending the most dominating complex valued feedback for updating the transmit weights, as is done in a preferred embodiment, the amount of feedback can be reduced while still enhancing system performance.

It will be understood by those skilled in the art that various modifications and changes may be made to the present invention without departure from the scope thereof, which is defined by the appended claims.

ABBREVIATIONS

BS Base station
DAS Distributed Antenna System
DL Downlink
DPC Dirty Paper Coding
IC Interference cancellation
ICIC InterCell Interference Coordination
MS Mobile station
OFDM Orthogonal Frequency Division Multiplexing
OFDMA Orthogonal Frequency Division Multiple Access
SINR Signal to Noise plus Interference Ratio
SIR Signal to Interference Ratio
SNR Signal to Noise Ratio
UL Uplink

REFERENCES

[1]. P. Larsson, "ADVANCED MULTI-SENSOR PROCESSING", (WO 2005/064975).
[2]. Jiansong Gan, Yunzhou Li, Limin Xiao, Shidong Zhou, and Jing Wang, "On Sum Rate and Power Consumption of Multi-User Distributed Antenna System with Circular Antenna Layout".
[3]. Viswanathan, H. Venkatesan, S. Huang, H. "Downlink capacity evaluation of cellular networks with known-interference cancellation, IEEE Journal on Selected Areas in Communications, June 2003, pp 802-811.
[4]. Jeffrey G. Andrews, Wan Choi, and Robert W. Heath Jr, "Overcoming Interference in Spatial Multiplexing MIMO Cellular Networks", Accepted to IEEE Wireless Communications Magazine, 2006.

The invention claimed is:

1. A method of downlink interference suppression for distributed antenna system based wireless cellular communication with transmit side linear interference cancellation, including the steps of determining, by a distributed antenna system based wireless communication system, effective complex channel matrix estimates;

differentially updating, by the distributed antenna system based wireless communication system, a complex transmit weight matrix in accordance with:

$$W^{(n+1)} = W^{(n)} \Delta W^{(n+1)}$$

where
$W^{(n+1)}$ is the updated complex transmit weight matrix,
$W^{(n)}$ is the previous complex transmit weight matrix, and
$\Delta W^{(n+1)}$ is a differential update matrix, defined by $$\Delta W^{(n+1)} = (E^{(n)})^{-1} Q$$

where
$E^{(n)}$ is an estimated effective complex channel matrix at least partially based on the determined estimates, and
Q is a predetermined desired link quality matrix.

2. A distributed antenna system based wireless cellular communication system with transmit side linear interference cancellation, including means adapted to determine effective complex channel matrix estimates;

means adapted to differentially update a complex transmit weight matrix in accordance with:

$$W^{(n+1)} = W^{(n)} \Delta W^{(n+1)}$$

where
$W^{(n+1)}$ is the updated complex transmit weight matrix,
$W^{(n)}$ is the previous complex transmit weight matrix, and
$\Delta W^{(n+1)}$ is a differential update matrix, defined by $$\Delta W^{(n+1)} = (E^{(n)})^{-1} Q$$

where
$E^{(n)}$ is an estimated effective complex channel matrix at least partially based on the determined estimates, and
Q is a predetermined desired link quality matrix.

3. The system of claim 2, wherein the means adapted to update the complex transmit weight matrix includes a matrix inverter inverting the estimated effective complex channel matrix $E^{(n)}$;

a differential update matrix forming unit connected to the matrix inverter for forming the differential update matrix $\Delta W^{(n+1)}$;

a transmit weight matrix update unit connected to the differential update matrix forming unit for updating the complex transmit weight matrix.

4. A transmit weight matrix processing method for distributed antenna system based wireless cellular communication with transmit side linear interference cancellation, including the steps of determining, by an inverter, the inverse of an effective complex channel matrix from estimates of an effective complex channel matrix reported by mobile stations;

updating, by a differential update matrix forming unit, a differential update matrix based on the determined inverse of the effective complex channel matrix;

differentially updating, by a transmit weight matrix update unit, a complex transmit weight matrix in accordance with:

$$W^{(n+1)} = W^{(n)} \Delta W^{(n+1)}$$

where
$W^{(n+1)}$ is the updated complex transmit weight matrix,
$W^{(n)}$ is the previous complex transmit weight matrix, and
$\Delta W^{(n+1)}$ is a differential update matrix, defined by $$\Delta W^{(n+1)} = (E^{(n)})^{-1} Q$$

where
$E^{(n)}$ is an estimated effective complex channel matrix at least partially based on the determined estimates, and
Q is a predetermined desired link quality matrix.

5. A transmit weight matrix processing apparatus for a distributed antenna system based wireless cellular communication system with transmit side linear interference cancellation, including
an inverter adapted to determine the inverse of an effective complex channel matrix from estimates of the effective complex channel matrix reported by mobile stations;
a differential update matrix forming unit adapted to update a differential update matrix based on the determined inverse of the effective complex channel matrix;
a transmit weight matrix update unit adapted to differentially update a complex transmit weight matrix in accordance with:

$$W^{(n+1)} = W^{(n)} \Delta W^{(n+1)}$$

where
$W^{(n+1)}$ is the updated complex transmit weight matrix,
$W^{(n)}$ is the previous complex transmit weight matrix, and
$\Delta W^{(n+1)}$ is a differential update matrix, determined in the differential update matrix forming unit as $$\Delta W^{(n+1)} = (E^{(n)})^{-1} Q$$

where
$E^{(n)}$ is an estimated effective complex channel matrix at least partially based on the determined estimates, and
Q is a predetermined desired link quality matrix.

\* \* \* \* \*

UNITED STATES PATENT AND TRADEMARK OFFICE
CERTIFICATE OF CORRECTION

PATENT NO. : 8,838,034 B2
APPLICATION NO. : 12/996846
DATED : September 16, 2014
INVENTOR(S) : Larsson It is certified that error appears in the above-identified patent and that said Letters Patent is hereby corrected as shown below:

In the Specification

In Column 7, Line 13, delete "$e_{11}^{(n}$, $e_{12}^{(n)}$" and insert -- $e_{11}^{(n)}$, $e_{12}^{(n)}$ --, therefor.

Signed and Sealed this
Twenty-fifth Day of August, 2015

Michelle K. Lee
*Director of the United States Patent and Trademark Office*